A. W. FRENCH.
STEAM COOKER FOR OIL BEARING MEAL AND THE LIKE.
APPLICATION FILED MAY 27, 1911.
1,015,013.  Patented Jan. 16, 1912.
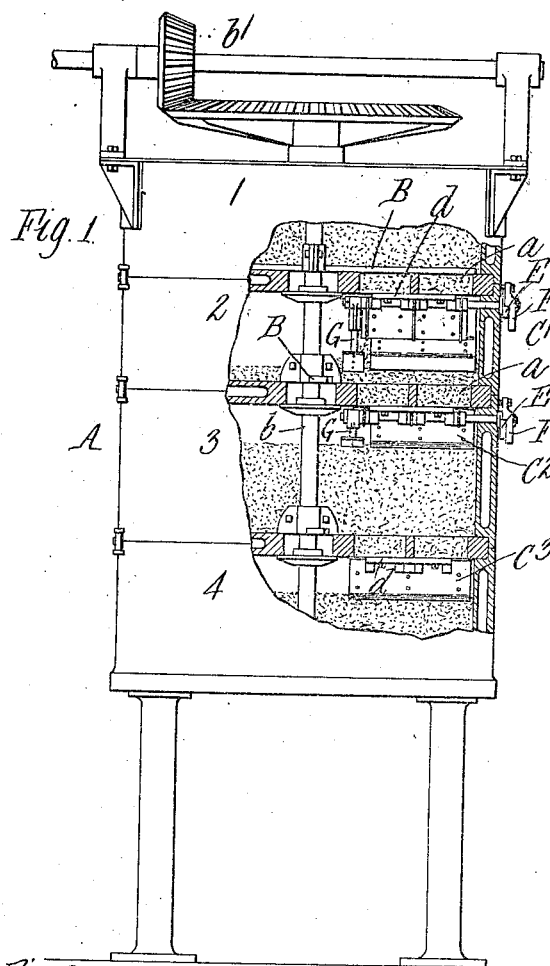
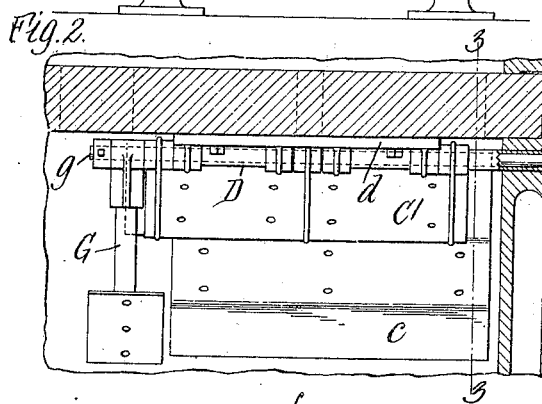
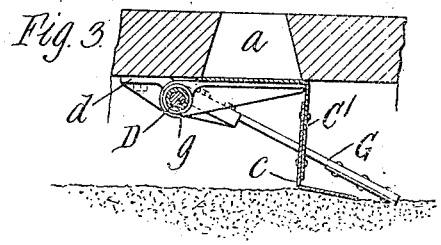
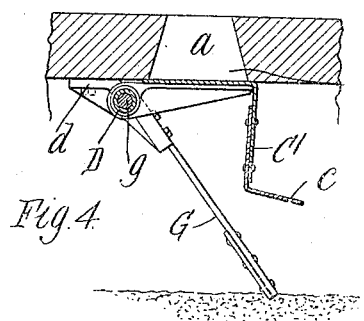
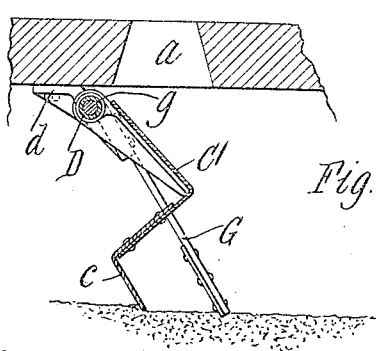
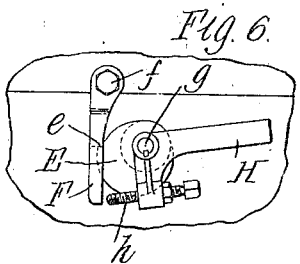
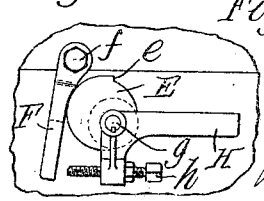
Witnesses
C. C. Easterbrooks
2. Bukenhagen
Inventor
Alfred W. French
By Wilhelm, Parker & Hard
Attorneys

UNITED STATES PATENT OFFICE.

ALFRED W. FRENCH, OF PIQUA, OHIO.

STEAM-COOKER FOR OIL-BEARING MEAL AND THE LIKE.

1,015,013.

Specification of Letters Patent.  Patented Jan. 16, 1912.

Application filed May 27, 1911. Serial No. 629,798.

*To all whom it may concern:*

Be it known that I, ALFRED W. FRENCH, a citizen of the United States, residing at Piqua, in the county of Miami and State of Ohio, have invented a new and useful Improvement in Steam-Cookers for Oil-Bearing Meal and the Like, of which the following is a specification.

This invention relates more particularly to improvements in continuous automatic cookers of the sort disclosed in U. S. Patent No. 909,773, granted January 12, 1909, to M. W. Faherty, assignor to the French Oil Mill Machinery Company, which are used in oil mills for cooking the oil bearing meal preparatory to expressing the oil therefrom. In the said patented cooker, a plurality of steam kettles, having bottom discharge openings, are arranged in a descending series, so that the meal can discharge by gravity from one kettle to that next below, the delivery of meal from one kettle to the next being automatically regulated by gates, the operation of which is controlled by the quantity of the meal in the kettles. When the meal is withdrawn from the bottom kettle to form a cake, the level of the meal lowers in this kettle, which allows the discharge gate of the next kettle above to open enough to permit a corresponding quantity of meal to discharge therefrom into the bottom kettle, and thereby lower the level of the meal in the second kettle, the discharge of meal from each kettle causing, in a similar manner, the delivery of meal thereto from the kettle next above. Meal is fed to the top kettle practically continuously by a suitable conveyer or feed device, and when the kettles have once been filled to the desired extent, the quantity of meal in each kettle is kept substantially constant by the automatic operation of the discharge gates, and as the meal is delivered into the top and is discharged from the bottom of each kettle and descends through the series of kettles, more or less in layers, without being mixed to any considerable extent, a definite period of time, determined by the rate at which the meal is drawn from the bottom kettle, is required for the meal to pass through the cooker. It has been found that when the meal is very wet and it is necessary to remove a considerable quantity of this excess moisture, this is accomplished more readily by employing stirrers or sweeps in the kettles which keep the meal in agitation or circulating so that the position thereof in the kettles is frequently changed. This comparatively rapid stirring or change in position of the meal in the kettles, not only facilitates a more rapid heating of the meal, but also prevents the possibility of scorching the meal by leaving it too long in contact with the heated parts of the kettles. If the meal is thus stirred or caused to change position in the kettles of a cooker, such as disclosed in said patent, in which a quantity of meal discharges from one kettle to the next, each time that meal is withdrawn from the bottom kettle, there is a possibility of some meal passing through the cooker without being properly cooked.

The object of this invention is to provide means for positively controlling the discharge gates of at least a portion of the kettles, so that when the gate of any one of these kettles is once closed by the action of the meal, it will remain closed until a considerable portion of the meal has been discharged from the kettle below, and will then open and deliver the meal promptly to such lower kettle until the meal accumulates in the latter sufficiently to again close the gate and prevent the further discharge of the meal until the level of the meal in said lower kettle has lowered to a predetermined level. In this way, the meal is retained in the kettles provided with said positively controlled discharge gates a sufficient length of time to prevent any meal from leaving the kettles in an uncooked condition.

In the accompanying drawings: Figure 1 is an elevation, partly in section, of an automatic steam cooker embodying the invention. Fig. 2 is a fragmentary sectional elevation thereof, on an enlarged scale, showing one of the discharge gates and its controlling mechanism. Fig. 3 is a section in line 3—3, Fig. 2, showing the position of the gate and the releasing device, when the kettle is filled to the desired level. Fig. 4 is a similar view showing the position of the parts, when the level of the meal has lowered in the kettle. Fig. 5 is a similar view showing the position of the parts, when the meal has lowered to the predetermined level for opening the gate. Fig. 6 is an elevation of the gate-locking and releasing devices, showing the same position of the parts as Fig. 4. Fig. 7 is an end elevation thereof. Fig. 8 is an elevation similar to Fig. 6, showing the position of the parts when the gate is open.

Like reference characters refer to like parts in the several figures.

A represents the cooker which comprises a series of heating kettles or chambers 1, 2, 3, 4, arranged in a descending series, or one below the other, so that the meal can discharge by gravity through the discharge opening $a$ in the bottom of one kettle into the next lower kettle. In the cooker shown in Fig. 1, four kettles are employed, arranged one directly over and upon the other, but the invention is not limited to this arrangement of the kettles, and they can be arranged in other ways, so long as the arrangement is such that the meal can discharge from one kettle to another. For instance, they can be arranged in a stepped series, as shown in the above mentioned patent. The cooker may also comprise any suitable number of kettles, which may be of any usual or suitable construction. The kettles shown are provided with hollow bottoms and side walls, forming steam chambers, which are supplied with steam in the usual way for cooking or heating the meal.

B represents the usual rotary stirrers or scrapers consisting of arms projecting laterally in the lower portions of the kettles from a vertical central shaft $b$ which is driven by any suitable mechanism $b'$. These stirrers are preferably of a shape adapted to produce a comparatively rapid stirring or change of position of the meal in the kettles.

$C'$ $C^2$ $C^3$ represent gates controlling the bottom discharge openings $a$ of the kettles, each kettle except the last or bottom kettle 4 being provided with one of these gates. The gate for each kettle is arranged on the underside thereof, so that it is located in and controlled by the meal in the next lower kettle. The gates are adapted to open by gravity, and the gate for each kettle is adapted to be closed, to prevent the discharge of meal therefrom by the meal accumulating in the next lower kettle. Each gate is preferably provided at its free edge with a depending bent flange or extension $c$ which is adapted to ride or float on the meal in the kettle in which the gate is located. The rotary stirrers cause the meal to circulate in the same direction that the stirrers rotate, and the meal acting against the depending extensions of the gates, acts to close the gates as the level of the meal rises in the kettles, the arrangement and proportion of the parts being such that when the meal has accumulated to a predetermined desired level in each kettle, it will completely close the gate for the next kettle above, and stop the discharge of meal therefrom. The actuation of the gates by the meal, as above described, is substantially the same as in said patented cooker.

The gates for at least one or more of the kettles are controlled by automatic mechanism for locking the gates when they have been closed by the action of the meal, as above described, and for releasing them again only when the meal has lowered to a predetermined level in the kettles in which the gates are located. All of the gates could be controlled in this way, but this is not necessary, and in the cooker illustrated, the controlling mechanism is applied only to the gates $C'$ $C^2$ of the two upper kettles. The controlling mechanism for each of these gates is preferably constructed as follows: The gate is secured to a hinge tube D, which is journaled in a hinge or bearing plate $d$ secured to the underside of the kettle, and extends to the outside of the cooker through a hole in the side wall thereof. The hinge tube D has secured to its outer end a latch disk, or plate E, provided with a tooth or shoulder $e$ adapted to be engaged by a latch or dog F, which is pivotally supported at $f$ in any suitable manner adjacent to the latch disk. The latch disk turns with the gate and the latch does not interfere with the gate being closed by the accumulating meal, but when the gate is closed, the latch F swings into engagement with the tooth of the latch disk E, as shown in Fig. 6, and prevents the return movement of the disk, thereby positively holding the gate in the closed position. A cam-shaped latch disk E and a gravity-actuated latch F are shown, but any other suitable latch or device adapted to prevent the closing of the gate, and to hold it closed until the latch is released, as presently described, could be employed.

G represents a latch-releasing arm or paddle, secured to the inner end of a rod $g$ which preferably passes through and is adapted to turn in the hinge tube D of the gate. A weighted bent trip device, or lever, H is rigidly secured to the outer end of the pivot rod $g$, and provided with an adjustable screw or part $h$ adapted to engage the latch F for disengaging it from the latch disk E to release the gate. The releasing paddle or arm G rides, or floats, on the meal in the kettle in which it is located, and is swung upwardly, or descends, accordingly as the level of the meal rises or falls in the kettle. When the meal has accumulated sufficiently to close the gate, the releasing arm will be held by the meal in the position shown in Fig. 3, and will hold the trip device H out of engagement with the latch F, the latch then holding the gate closed. The releasing arm will swing downwardly, as the level of the meal is lowered in the kettle, by withdrawing the meal from the bottom kettle, and when the meal has lowered to the predetermined desired level, the trip device will strike and disengage the latch F from the latch disk, as indicated in Fig. 8, thereby releasing the gate and permitting it to swing open.

In the operation of the cooker the level of the meal will lower slightly in the bottom kettle each time meal is drawn therefrom to form a cake, and the gate $C^3$, which is controlled by the level of the meal in the bottom kettle operates, as described, to deliver meal to the bottom kettle from the kettle 3 next above to replace the meal withdrawn from the bottom kettle and thereby maintain a substantially constant quantity of meal therein. The level of the meal is thus lowered in the second kettle 3, and the releasing arm or paddle G therein descends gradually with the decreasing quantity of meal until, when the meal reaches the predetermined desired low level, the trip device H will actuate the latch and release the gate $C^2$ of the next kettle 2. This gate will then swing open and permit the meal to discharge promptly from the kettle 2 into the kettle 3. This will raise the level of the meal in the kettle 3 and the gate $C^2$ will be again closed by the accumulating meal and locked by its latch, as before explained. The discharge of meal from the kettle 2 will lower the level therein and cause the operation of the gate $C'$ for the top kettle in the same way, the bulk of the meal being, in this way, discharged in succession, first from the kettle 2 and then from the top kettle 1. As before stated, the meal could be discharged in this way in bulk and in succession from all of the kettles except the bottom one by providing the gate of each of these kettles with the controlling mechanism, but this is not essential to the successful operation of the cooker.

I claim as my invention:

1. The combination with a plurality of heating kettles or chambers for solid material arranged to permit the material to discharge from one kettle into another, of a gate which controls the discharge of the material from the former kettle and is closed by the material accumulating in the latter kettle, and controlling means which holds said gate closed until the material is reduced substantially to a predetermined level in said latter kettle and then automatically release the gate to discharge material from said former kettle into said latter kettle, substantially as set forth.

2. The combination with a plurality of heating kettles or chambers for solid material arranged at different elevations to permit the material to discharge from an upper kettle into a lower one, of a gate which controls the discharge of the material from the upper to the lower kettle and is closed by the material accumulating in the lower kettle, and means controlled by the material in the lower kettle which operate automatically to hold said gate closed until the material is reduced substantially to a predetermined level in the lower kettle and then release the gate to discharge material from the upper kettle into the lower one, substantially as set forth.

3. The combination with a plurality of heating kettles or chambers for solid material arranged at different elevations to permit the material to discharge from an upper kettle into a lower one, of a gate which controls the discharge of the material from the upper to the lower kettle, a latch for holding said gate closed, and a latch-releasing device controlled by the material in the lower kettle which operates said latch to release the gate when the material is reduced substantially to a predetermined level in the lower kettle, for discharging material from the upper kettle, substantially as set forth.

4. The combination with a plurality of heating kettles or chambers for solid material arranged at different elevations to permit the material to discharge from an upper kettle into a lower one, of a gate which controls the discharge of the material from the upper to the lower kettle and is closed by the material accumulating in the lower kettle, a latch for holding said gate closed, and a latch-releasing device controlled by the material in the lower kettle which operates said latch to release the gate when the material is reduced substantially to a predetermined level in the lower kettle, substantially as set forth.

5. The combination with a plurality of heating kettles or chambers for solid material arranged to permit the material to discharge from one kettle into another, of a gate which controls the discharge of the material from the former kettle, an automatic latch which holds said gate when it has been closed, and a latch-releasing device which is caused to move by the changing of the level of the material in said latter kettle and operates said latch to release the gate when the material is reduced substantially to a predetermined level in said latter kettle, substantially as set forth.

6. The combination with a plurality of heating kettles or chambers for solid material arranged at different elevations to permit the material to discharge from an upper kettle into a lower one, of a hinged gate which controls the discharge of the material from the upper to the lower kettle and is closed by the material accumulating in the lower kettle, a hollow hinged rod to which the gate is secured, a latch which holds said gate when it has been closed by the material, a latch-releasing rod which is movable in said hollow hinge rod, an arm secured to said latch-releasing rod which is caused to move by the changing of the level of the material in the lower kettle, and a trip device secured to said movable rod and adapted to actuate said latch to release the gate, substantially as set forth.

7. The combination with a plurality of heating kettles or chambers for solid material arranged at different elevations to permit the material to discharge from an upper kettle into a lower one, of a gate for each kettle except the bottom one which is positively operated by the material accumulating in one kettle to control the delivery of material thereto from a higher kettle, and automatic controlling means for the gate of at least one of said kettles which hold said gate closed until the material is reduced substantially to a predetermined level in the next lower kettle and then release the gate, substantially as set forth.

Witness my hand, this 20th day of May, 1911.

ALFRED W. FRENCH.

Witnesses:
 CHAS. B. UPTON,
 M. M. WHITLOCK.